Sept. 4, 1951  R. A. RUSCETTA  2,566,903
ELECTROLYTIC CAPACITOR
Filed Dec. 28, 1949
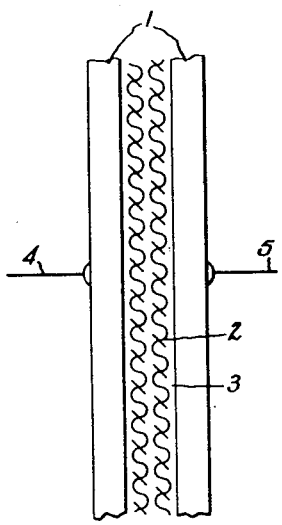
Inventor:
Ralph A. Ruscetta,
by
His Attorney.

Patented Sept. 4, 1951

2,566,908

UNITED STATES PATENT OFFICE 2,566,908

ELECTROLYTIC CAPACITOR

Ralph A. Ruscetta, Pittsfield, Mass., assignor to General Electric Company, a corporation of New York Application December 28, 1949, Serial No. 135,330

4 Claims. (Cl. 175—315)

This invention relates to electrolytic capacitors. More particularly, it relates to electrolytic capacitors which retain their capacitance at extremely low temperatures.

In certain applications it is desirable that capacitors operate over a wide range of temperatures without substantial loss in capacitance. An example of such use is in radio transmitters and receivers. However, it has been found that while many electrolytic capacitors have a high and suitable capacitance at room temperature and above, the capacitance decreases so substantially at low temperatures as to make them useless for practical purposes.

An object of this invention is to provide an electrolytic capacitor which has a favorable capacitance value over a wide range of temperatures.

Another object of the present invention is to provide an electrolytic capacitor which maintains a suitable capacitance at temperatures ranging from about +85° C. down to about −55° C.

Other objects will become apparent from a consideration of the following description and the drawing in which the single figure shows schematically a capacitor such as is taught by the present invention.

It has been found that an electrolytic capacitor which has and maintains a suitably high capacitance over a wide range of ambient temperatures may be made by using an electrode of sintered tantalum and an electrolyte of phosphoric acid.

Porous, sintered tantalum metal elements when oxidized and immersed in an electrolyte, produce a capacitor having a high capacitance per unit volume. It is possible to use as electrolytes acidic aqueous solutions of very high conductivity because of the inherent chemical stability of the tantalum oxide film. The stability of the tantalum oxide film is in contradistinction to that of aluminum oxide which would be readily dissolved and destroyed by such highly acid solutions.

The tantalum electrodes of this invention may be oxidized in any usual manner. For example, they may be oxidized by immersing in a one percent by weight solution of ammonium carbonate and subjecting to a 200 volts D.-C. current. Alternatively, they may be oxidized by immersion in a ten percent sulfuric acid solution at 150 volts D.-C. Any number of other solutions and methods may be used to provide an oxide coating on the porous sintered tantalum electrodes, which methods will be apparent to those skilled in the art.

As shown in the drawing the tantalum plates 1, preferably about 0.090 inch thick, are arranged in stacked relationship with a spacer 2 between the plates. This spacer may conveniently be made up of two strips of 0.003 inch thick glass fiber cloth though other acid-resistant material may also be employed. The entire assembly is immersed in an electrolyte 3 and terminals 4 and 5 attached as shown.

A number of electrolytes were used in the capacitor above described and the microfarad capacitance and percent power factor measured at 25 volts A.-C. and a frequency of 60 cycles per second at various temperatures.

Example 1

[Electrolyte: 70% by weight $H_2O$; 30% by weight concentrated $H_2SO_4$.]

| Test Temperature, °C. | Capacitance, Mfd. | Per Cent Power Factor, 60 cycle | Relative Capacity, Per Cent |
|---|---|---|---|
| 71 | 10.80 | 6.80 | 118.0 |
| 61 | 9.88 | 4.90 | 108.0 |
| 25 | 9.17 | 2.40 | 100.0 |
| −18 | 8.93 | 2.87 | 97.7 |
| −40 | 8.58 | 5.00 | 93.8 |
| −53 | 8.35 | 8.00 | 91.2 |
| −62 | 8.13 | 23.6 | 89.0 |

While the tantalum sulfuric acid capacitor lost only 11% of its 25° C. capacitance at −62° C. and the power factor of 23.6 percent at the lower temperature is satisfactory, the reactivity of the sulfuric acid with the materials that are commonly used for casing and sealing the assembly necessarily makes any prolonged use of this combination impractical.

Example 2

[Electrolyte: 90% by weight ethylene diamine; 10% by weight ammonium chloride.]

| Test Temperature, °C. | Capacitance, Mfd. | Per Cent Power Factor, 60 cycle | Relative Capacity, Per Cent |
|---|---|---|---|
| 25 | 8.83 | 11.1 | 100.0 |
| 8 | 8.58 | 23.4 | 97.2 |
| −12 | 6.78 | 91.3 | 78.0 |

From the above it will be noted that even at −12° C., the capacitance was substantially reduced making the capacitor useless at even this relatively high temperature.

Example 3

[Electrolyte: 75% by weight H₂O; 25% by weight ammonium chloride.]

| Test Temperature, °C. | Capacitance, Mfd. | Per Cent Power Factor, 60 cycle | Relative Capacity, Per Cent |
|---|---|---|---|
| 25 | 9.34 | 3.05 | 100.0 |
| −12 | 9.03 | 2.90 | 97.0 |
| −15 | 8.9 | 35.0 | 95.0 |
| −20 | 2.± | 90.± | 20.± |

From the above it will be seen that at −20° C. the capacitance is unacceptably low when using such an electrolyte.

Example 4

[Electrolyte: 70% by weight H₂O; 30% by weight calcium chloride.]

| Test Temperature, °C. | Capacitance, Mfd. | Per Cent Power Factor, 60 cycle | Relative Capacity, Per Cent |
|---|---|---|---|
| 75 | 9.82 | 5.42 | 106.0 |
| 50 | 9.43 | 4.13 | 101.8 |
| 25 | 9.28 | 3.42 | 100.0 |
| −29 | 8.87 | 6.30 | 94.5 |
| −41 | 8.75 | 12.6 | 94.2 |
| −52 | 2.5 | 96.0 | 27.0 |

While the above capacitor had satisfactory characteristics down to −41° C., the capacitance at −52° C. is undesirably reduced.

Example 5

[Electrolyte: 50% by weight H₃PO₄; 50% by weight H₂O.]

| Test Temperature, °C. | Capacitance, Mfd. | Per Cent Power Factor, 60 cycle | Relative Capacity, Per Cent |
|---|---|---|---|
| 75 | 9.87 | 5.55 | 108.0 |
| 50 | 9.37 | 3.40 | 102.8 |
| 25 | 9.12 | 2.51 | 100.0 |
| −10 | 8.83 | 2.93 | 97.0 |
| −40 | 8.56 | 6.90 | 94.0 |
| −50 | 8.38 | 20.3 | 92.0 |
| −57 | 7.92 | 51.0 | 87.0 |

Even at −57° C. the capacitance of the above capacitor was substantially unreduced. The power factor is also within a suitable range. The 108° C. boiling point of the electrolyte makes it available for use at temperatures from as high as +75° C. down to below −55° C.

Example 6

[Electrolyte: 60% by weight H₃PO₄; 40% by weight H₂O.]

| Test Temperature, °C. | Capacitance, Mfd. | Per Cent Power Factor, 60 cycle | Relative Capacity, Per Cent |
|---|---|---|---|
| 75 | 10.2 | 5.55 | 108.6 |
| 50 | 9.67 | 4.47 | 103.0 |
| 25 | 9.37 | 3.88 | 100.0 |
| −21 | 8.92 | 4.95 | 95.3 |
| −43 | 8.63 | 12.3 | 92.2 |
| −55 | 8.38 | 30.5 | 89.5 |
| −60 | 8.12 | 52.0 | 86.7 |

It will be seen from the above that this capacitor may be used at temperatures as low as −60° C.

the capacitance being 86.7% of that at +25° C. or substantially unchanged. The power factor even at the low temperature is still within a useful range. The 119° C. boiling point makes this electrolyte available for applications in which the temperatures rise to as high as 75° C.

Example 7

[Electrolyte: 85% by weight H₃PO₄; 15% by weight H₂O.]

| Test Temperature, °C. | Capacitance, Mfd. | Per Cent Power Factor, 60 cycle | Relative Capacity, Per Cent |
|---|---|---|---|
| 100 | 10.2 | 6.5 | 110. |
| 73 | 9.56 | 4.36 | 103.5 |
| 50 | 9.28 | 3.45 | 100.5 |
| 25 | 9.23 | 2.93 | 100.0 |
| −10 | 8.92 | 6.40 | 96.5 |
| −25 | 8.76 | 14.0 | 94.8 |
| −40 | 8.35 | 47.0 | 90.5 |
| −45 | 8.00 | 76.0 | 87.0 |

The above capacitor may be efficiently used at temperatures as low as −45° C. The 155° C. boiling point of this electrolyte makes possible its use at ambient temperatures up to about 85° C.

From the above examples it will be evident that capacitors comprising armatures of porous sintered tantalum separated by a suitable spacer and having an electrolyte of phosphoric acid in concentrations of from 50% to 85% by weight have particularly stable capacitance over a range of temperatures as high as +85° C. to as low as −60° C.

What I claim as new and desire to secure by Letters Patent of the United States is:

1. An electrolytic capacitor comprising cooperating armatures of tantalum, spacers and an electrolytic medium consisting of fifty to eighty-five percent phosphoric acid, the remainder being water.

2. An electrolytic capacitor designed to operate at temperatures ranging from +85° C. to −45° C. comprising cooperating armatures of tantalum, spacers and an electrolyte consisting of eighty-five percent phosphoric acid, the remainder being water.

3. An electrolytic capacitor designed to operate at temperatures ranging from +75° C. to −60° C., comprising cooperating armatures of tantalum, spacers and an electrolyte consisting of sixty percent by weight phosphoric acid and forty percent by weight water.

4. An electrolytic capacitor designed to operate at temperatures from +75° C. to about −60° C. comprising cooperating armatures of tantalum, spacers and an electrolyte consisting of fifty percent by weight phosphoric acid and fifty percent by weight water.

RALPH A. RUSCETTA.

REFERENCES CITED

The following references are of record in the file of this patent:

UNITED STATES PATENTS

| Number | Name | Date |
|---|---|---|
| 1,141,402 | Mershon | June 1, 1915 |
| 2,005,279 | Van Geel | June 18, 1935 |
| 2,174,841 | Robinson | Oct. 3, 1939 |
| 2,299,228 | Gray | Oct. 20, 1942 |
| 2,359,970 | Clark | Oct. 10, 1944 |